(12) United States Patent  
Walker

(10) Patent No.: US 10,401,643 B2  
(45) Date of Patent: Sep. 3, 2019

(54) INTERCHANGEABLE EYEGLASSES

(71) Applicant: Rasheed Bernard Walker, Washington, DC (US)

(72) Inventor: Rasheed Bernard Walker, Washington, DC (US)

(*) Notice: Subject to any disclaimer, the term of this patent is extended or adjusted under 35 U.S.C. 154(b) by 0 days.

(21) Appl. No.: 15/762,119

(22) PCT Filed: Sep. 22, 2016

(86) PCT No.: PCT/US2016/053204  
§ 371 (c)(1),  
(2) Date: Mar. 22, 2018

(87) PCT Pub. No.: WO2017/053632  
PCT Pub. Date: Mar. 30, 2017

(65) Prior Publication Data  
US 2018/0267337 A1    Sep. 20, 2018

Related U.S. Application Data

(63) Continuation-in-part of application No. 14/861,894, filed on Sep. 22, 2015.

(51) Int. Cl.  
*G02C 11/02* (2006.01)  
*G02C 5/02* (2006.01)  
*G02C 5/22* (2006.01)  
*G02C 5/14* (2006.01)  
*G02C 5/00* (2006.01)  
*G02C 5/06* (2006.01)

(52) U.S. Cl.  
CPC .............. *G02C 5/001* (2013.01); *G02C 5/02* (2013.01); *G02C 5/06* (2013.01); *G02C 5/14* (2013.01); *G02C 5/2218* (2013.01); *G02C 11/02* (2013.01); *G02C 2200/08* (2013.01)

(58) Field of Classification Search  
CPC ...... G02C 2200/08; G02C 11/02; G02C 5/02; G02C 5/001; G02C 5/06; G02C 5/14; G02C 5/2218  
USPC ............. 351/94, 105, 116, 138, 140; 16/228  
See application file for complete search history.

(56) References Cited

U.S. PATENT DOCUMENTS 1,744,993 A * 1/1930 Tamplin ................... G02C 5/02  
351/51  
4,756,612 A * 7/1988 Hyman .................... G02C 5/02  
351/124

(Continued)

FOREIGN PATENT DOCUMENTS

CA    2075505    * 6/1992 ............. G02C 11/02  
WO   WO92/010777 * 6/1992 ............. G02C 11/02

*Primary Examiner* — George G King  
(74) *Attorney, Agent, or Firm* — Shane Cortesi

(57) ABSTRACT

A pair of eyeglasses with interchangeable parts is described herein. The pair of eyeglasses have a bridge that optionally includes a front piece that detaches from a rear piece without the need for any tools. The bridge is located between the left and right rims of the eyeglasses and connects the left rim and right rim. Optionally, the front piece and rear piece of the bridge sandwich the left and right rims. Optionally, the pair of eyeglasses also includes left and right temples that connect and disconnect from the left and right rims, respectively, using a spring-loaded locking mechanism. Methods of wearing the eyeglasses and changing parts are also described.

13 Claims, 17 Drawing Sheets

(56) References Cited

U.S. PATENT DOCUMENTS

| | | | | |
|---|---|---|---|---|
| 4,798,455 A | * | 1/1989 | Yoe | G02C 5/02 |
| | | | | 351/158 |
| 2003/0058402 A1 | * | 3/2003 | Conner | G02C 1/02 |
| | | | | 351/110 |
| 2008/0100793 A1 | * | 5/2008 | Wied | G02C 1/02 |
| | | | | 351/116 |

* cited by examiner

INTERCHANGEABLE EYEGLASSES

BACKGROUND

Technical Field

The present invention relates to interchangeable eyeglasses, more particularly, eyeglasses in which the rims and temples may be changed and in which the left and right rims may be different shapes.

Background of the Invention

Frameri (Cincinnati, Ohio) sells eyeglasses in which the lenses are removable so that the user can take out his/her prescription lenses and substitute in sunglass lenses. Users, however, wear eyeglasses not only to see but for fashion statements and the Frameri system does not allow the user to change the look of the frames depending on the occasion.

U.S. Pat. No. 9,081,213 describes a pair of interchangeable eyeglasses that consist of lenses that can attach to different frames. However, it is believed that the eyeglasses of the aforementioned patent would only accommodate rims having the same shape, which would be undesirable in occasions when it is desired that the rims be different shapes, such as on New Year's Eve for example.

U.S. Pat. No. 7,543,930 describes an adaptor for eyeglass lenses. Although the aforementioned patent described the adaptor being usable for lenses having various shapes, the adapter must be used with lenses that have a common upper shape.

Thus, there is a need for fully interchangeable eyeglasses.

BRIEF SUMMARY

The present disclosure provides a pair of interchangeable eyeglasses configured to be worn by a human user and methods of using the same.

In some embodiments, the pair of interchangeable eyeglasses includes: a) a left rim configured to be worn in front of the human user's left eye and comprising a front having a lengthwise center dividing the front of the left rim into a left side and a right side, and a rear having a lengthwise center dividing the rear of the left rim into a left side and a right side; b) a right rim configured to be worn in front of the human user's right eye and comprising a front having a lengthwise center dividing the front of the right rim into a left side and a right side, and a rear having a lengthwise center dividing the rear of the right rim into a left side and a right side; c) a bridge configured to rest above the human user's nose, the bridge located between the left rim and the right rim and connecting the right rim to the left rim, the bridge removably attached to the left rim and the right rim, the bridge comprising a front piece having a front surface having a lengthwise center dividing the front surface of the front piece into a left side and a right side and a rear surface having a lengthwise center dividing the rear surface of the front piece into a left side and a right side, and a rear piece having a front surface having a lengthwise center dividing the front surface of the rear piece into a left side and a right side and a rear surface having a lengthwise center dividing the rear surface of the rear piece into a left side and a right side, the front surface of the rear piece facing the rear surface of the front piece, the left side of the rear surface of the front piece removably attached to the right side of the front of the left rim and the left side of the front surface of the rear piece by at least one left fastener and the right side of the rear surface of the front piece removably attached to the left side of the front of the right rim and the right side of the front surface of the rear piece by at least one right fastener; d) a left temple comprising a top, a bottom, a front end removably connected to the left side of the rear of the left rim and a rear end comprising a curved temple tip configured to be worn around the human user's left ear, the left temple configured to pivot about a left temple pivot axis from an expanded position in which the left temple is approximately 90 degrees relative to the left rim to a collapsed position in which the left temple is approximately parallel to the left rim; and e) a right temple comprising a top, a bottom, a front end removably connected to the right side of the rear of the right rim and a rear end comprising a curved temple tip configured to be worn around the human user's right ear, the right temple configured to pivot about a right temple pivot axis from an expanded position in which the right temple is approximately 90 degrees relative to the right rim to a collapsed position in which the right temple is approximately parallel to the right rim. Optionally, the left rim is located between the front piece of the bridge and the rear piece of the bridge. Optionally, the right rim is located between the front piece of the bridge and the rear piece of the bridge. Optionally, the left side of the rear surface of the front piece is configured to detach from the right side of the front of the left rim and the left side of the front surface of the rear piece without any tools and the right side of the rear surface of the front piece is configured to detach from the left side of the front of the right rim and the right side of the front surface of the rear piece without any tools. Optionally, the left temple is configured to disconnect from the left rim without any tools, and further wherein the right temple is configured to disconnect from the right rim without any tools. Optionally, the bridge is the sole point of connection between the left rim and right rim.

Optionally, the left rim comprises a hole extending through the left rim and the right rim comprises a hole extending through the right rim, wherein the left side of the front surface of the rear piece comprises a hole and the right side of the front surface of the rear piece comprises a hole, the left side of the rear surface of the front piece comprises a left peg extending through the hole in the left rim and through the hole in the left side of the front surface of the rear piece, and the right side of the rear surface of the front piece comprises a right peg extending through the hole in the right rim and through the hole in the front surface of the right side of the rear piece, and the at least one left fastener comprises the left peg and the at least one right fastener comprises the right peg. Optionally, the pegs and the holes each have a width/diameter and further wherein the width/diameter of the right peg of the right side of the rear surface of the front piece is larger than the width/diameter of the hole in the right side of the front surface of the rear piece and further wherein the width/diameter of the left peg of the left side of the rear surface of the front piece is larger than the width/diameter of the hole in the left side of the front surface of the rear piece. Optionally, the pair of interchangeable eyeglasses further includes a removable pin, which farther secures the front piece and the rear piece, and the pin includes one or more posts that extend vertically and transverse/perpendicularly relative to the pegs. Optionally, the holes in the front surface of the rear piece are generally circular in shape and each hole in the front surface of the rear piece is connected to a plurality of slits that are spaced substantially evenly about the circumferences of the holes in the front surface of the rear piece. Optionally, the left rim comprises a left rim upper hole extending through the left rim and a left rim lower hole located below the left rim upper hole and extending through the left rim, and the right rim comprises a right rim upper hole extending through the right rim and a right rim lower hole located below the right rim upper hole extending through the right rim, wherein the front surface of the rear piece of the bridge comprises a left side upper hole, a left side lower hole located below the left side upper hole, a right side upper hole located to the right of the left side upper hole and a right side lower hole located below the right side upper hole, wherein the left side of the rear surface of the front piece comprises a front piece left side upper peg extending through the left rim upper hole and through the left side upper hole, wherein the left side of the rear surface of the front piece comprises a front piece left side lower peg located below the front piece left side upper peg and extending through the left rim lower hole and through the left side lower hole, and further wherein the right side of the rear surface of the front piece comprises a front piece right side upper peg extending through the right rim upper hole and through the right side upper hole, wherein the right side of the rear surface of the front piece comprises a front piece right side lower peg located below the front piece right side upper peg and extending through the right rim lower hole and through the right side lower hole, and further wherein the at least one left fastener comprises the front piece left side upper peg and the front piece left side lower peg, and the at least one right fastener comprises the front piece right side upper peg and the front piece right side lower peg. Optionally, the left rim comprises a hole extending through the left rim and the right rim comprises a hole extending through the right rim, wherein the rear surface of the front piece of the bridge comprises a right side hole and a left side hole located to the left of the right side hole, wherein the left side of the front surface of the rear piece comprises a left peg extending through the hole in the left rim and through the left side hole, and further wherein the right side of the front surface of the rear piece comprises a right peg extending through the hole in the right rim and through the right side hole, and further wherein the at least one left fastener comprises the left peg and the at least one right fastener comprises the right peg. Optionally, the pegs and the holes each have a width/diameter and further wherein the width/diameter of the peg of the right side of the front surface of the rear piece is larger than the width/diameter of the right side hole and further wherein the width/diameter of the peg of the left side of the front surface of the rear piece is larger than the left side hole. Optionally, the right side and left side hole are generally circular in shape, the right side hole is connected to a plurality of slits that are spaced substantially evenly about the circumference of the right side hole, and further wherein the left side hole is connected to a plurality of slits that are spaced substantially evenly about the circumference of the left side hole. Optionally, the left rim comprises a left rim upper hole extending through the left rim and a left rim lower hole located below the left rim upper hole and extending through the left rim, and the right rim comprises a right rim upper hole extending through the right rim and a right rim lower hole below the right rim upper hole and extending through the right rim, wherein the rear surface of the front piece comprises a left side upper hole, a left side lower hole located below the left side upper hole, a right side upper hole located to the right of the left side upper hole and a right side lower hole located below the right side upper hole, wherein the left side of the front surface of the rear piece comprises a rear piece left side upper peg extending through the left rim upper hole and through the left side upper hole, wherein the left side of the front surface of the rear piece comprises a rear piece left side lower peg located below the rear piece left side upper peg and extending through the left rim lower hole and through the left side lower hole, and further wherein the right side of the front surface of the rear piece comprises a rear piece right side upper peg extending through the right rim upper hole and through the right side upper hole, wherein the right side of the front surface of the rear piece comprises a rear piece right side lower peg located below the rear piece right side upper peg and extending through the right rim lower hole and through the right side lower hole, and further wherein the at least one left fastener comprises the rear piece left side upper peg and the rear piece left side lower peg, and the at least one right fastener comprises the rear piece right side upper peg and the rear piece right side lower peg.

Optionally, the bridge is comprised of an elastomeric material. Optionally, the pair of interchangeable eyeglasses further include a left hinge piece comprising a left pin forming the left temple pivot axis, the left hinge piece connecting the left temple to the left rim, the left hinge piece comprising a front end attached to the rear of the left side of the left rim and a rear end removably attached to the left temple, wherein the front end of the left temple comprises a left temple groove extending from the top of the left temple downward, the left temple groove not extending to the bottom of the left temple, the front end of the left temple further comprising a left temple lid located at the top of the left temple, the left temple lid having a front end and a rear end, the left temple lid having a closed position in which the left temple lid covers the left hinge piece and prevents the left hinge piece from detaching from the left temple and an open position in which the left temple lid does not cover the left hinge piece and allows the left hinge piece to detach from the right temple, the left temple lid configured to slide along the top of the left temple from the closed position to the open position, the rear end of the left temple lid connected to a left temple spring configured to bias the left temple lid in the closed position. Optionally, the left temple and left hinge piece comprise mating teeth. Optionally, the pair of interchangeable eyeglasses further includes a right hinge piece comprising a right pin forming the right temple pivot axis, the right hinge piece connecting the right temple to the right rim, the right hinge piece comprising a front end attached to the rear of the right side of the right rim and a rear end removably attached to the right temple, wherein the front end of the right temple comprises a right temple groove extending from the top of the right temple downward, the right temple groove not extending to the bottom of the right temple, the front end of the right temple further comprising a right temple lid located at the top of the right temple, the right temple lid having a front end and a rear end, the right temple lid having a closed position in which the right temple lid covers the right hinge piece and prevents the right hinge piece from detaching from the right temple and an open position in which the right temple lid does not cover the right hinge piece and allows the right hinge piece to detach from the right temple, the right temple lid configured to slide along the top of the right temple from the closed position to the open position, the rear end of the right temple lid connected to a spring configured to bias the spring loaded lid in the closed position. Optionally, the pair of interchangeable eyeglasses further include a sloped left nose pad attached to the left rim and configured to rest against the left side of the human user's nose and a sloped right nose pad attached to the right rim and configured to rest against the right side of the human user's nose. Optionally, the pair of interchangeable eyeglasses further include a left lens located in the left rim and a right rim located in the right rim. Optionally, the right rim comprises a top surface having a first shape and the left rim comprises a top surface having a second shape, the first shape different than the second shape.

The present disclosure also provides a method of wearing a pair of interchangeable eyeglasses by a human user comprising the steps of: a) providing the pair of interchangeable eyeglasses; b) positioning the bridge above the human user's nose; c) positioning the left rim in front of the human user's left eye; d) positioning the right rim in front of the human user's right eye; e) positioning the left temple tip around the human user's left ear; and f) positioning the right temple tip around the human user's right ear.

The present disclosure also provides a method of wearing a pair of interchangeable eyeglasses by a human user comprising the steps of:

a) providing a pair of interchangeable eyeglasses comprising:

i) a left rim configured to be worn in front of the human user's left eye and comprising a front having a lengthwise center dividing the front of the left rim into a left side and a right side, and a rear having a lengthwise center dividing the rear of the left rim into a left side and a right side;

ii) a right rim configured to be worn in front of the human user's right eye and comprising a front having a lengthwise center dividing the front of the right rim into left side and a right side, and a rear having a lengthwise center dividing the rear of the right rim into a left side and a right side;

iii) a bridge configured to rest above the human user's nose, the bridge located between the left rim and the right rim and connecting the right rim to the left rim, the bridge removably attached to the left rim and the right rim;

iv) a left temple comprising a top, a bottom, a front end removably connected to the left side of the rear of the left rim and a rear end comprising a curved temple tip configured to be worn around the human user's left ear, the left temple configured to pivot about a left temple pivot axis from an expanded position in which the left temple is approximately 90 degrees relative to the left rim to a collapsed position in which the left temple is approximately parallel to the left rim; and v) a right temple comprising a top, a bottom, a front end removably connected to the right side of the rear of the right rim and a rear end comprising a curved temple tip configured to be worn around the human user's right ear, the right temple configured to pivot about a right temple pivot axis from an expanded position in which the right temple is approximately 90 degrees relative to the right rim to a collapsed position in which the right temple is approximately parallel to the right rim;

wherein the bridge is configured to disconnect from the left rim and right rim without any tools, wherein the left temple is configured to disconnect from the left rim without any tools, and wherein the right temple is configured to disconnect from the right rim without any tools and further wherein the left rim has a first shape and the right rim has a second shape;

b) disconnecting the left rim from the left temple and the right rim from the right temple; and c) connecting a left rim having a third shape to the left temple and connecting a right rim having a fourth shape to the right temple, wherein the first shape is different than the third shape and wherein the second shape is different than the fourth shape.

Optionally, the method also includes; d) positioning the bridge above the human user's nose; e) positioning the left rim in front of the human user's left eye; f) positioning the right rim in front of the human user's right eye; g) positioning the left temple tip around the human user's left ear; and h) positioning the right temple tip around the human user's right ear.

BRIEF DESCRIPTION OF THE DRAWINGS

in FIG. 1, the left and right temples are in the expanded position.

in FIG. 6, the lid of the right temple is not shown.

FIG. 10A is an exploded view and FIG. 10B is an assembled view.

in FIG. 11, the left and right temples are in the collapsed position.

in FIG. 12, the left and right temples are in the collapsed position and the central portions of the front and rear pieces of the bridge are permanently attached.

DETAILED DESCRIPTION

Figure 1:
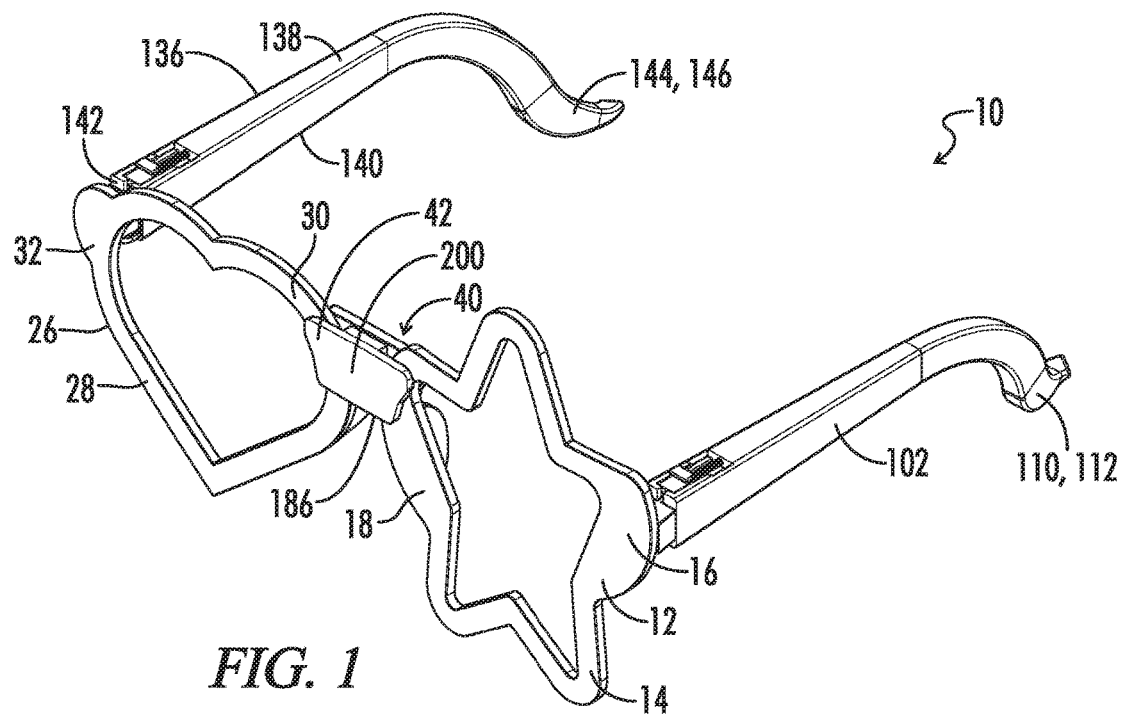
FIG. 1 illustrates a front, perspective view of a pair of interchangeable eyeglasses of one embodiment of the present invention.

With reference to FIGS. 1-13, the present invention provides a pair of interchangeable eyeglasses designated by the numeral 10. In the drawings, not all reference numbers are included in each drawing for the sake of clarity.

Referring further to FIGS. 1-13 in some embodiments, the pair of interchangeable eyeglasses 10 includes: a) a left rim 12 configured to be worn in front of the human user's left eye and comprising a front 14 having a lengthwise center 192 dividing the left rim front 14 into a left side 16 and a right side 18, and a rear 19 having a lengthwise center 194 dividing the left rim rear 19 into a left side 20 and a right side 22; b) a right rim 26 configured to be worn in front of the human user's right eye and comprising a front 28 having a lengthwise center 196 dividing the right rim front 28 into a left side 30 and a right side 32, and a rear 33 having a lengthwise center 198 dividing the right rim rear 28 into a left side 34 and a right side 36; c) a bridge 40 configured to rest above the human user's nose, the bridge 40 located between the left rim 12 and the right rim 26 and connecting the right rim 26 to the left rim 12, the bridge 40 removably attached to the left rim 12 and the right rim 26; d) a left temple 102 comprising a top 104, a bottom 106, a front end 108 removably connected to the left side 20 of the rear 19 of the left rim 12 and a rear end 110 comprising a curved temple tip 112 configured to be worn around the user's left ear, the left temple 102 configured to pivot about a left temple pivot axis 116 from an expanded position in which the left temple 102 is approximately 90 degrees relative to the left rim 12 to a collapsed position in which the left temple 102 is approximately parallel to the left rim 12; and e) a right temple 136 comprising a top 138, a bottom 140, a front end 142 removably connected to the right side 36 of the rear 33 of the right rim 26 and a rear end 144 comprising a curved temple tip 146 configured to be worn around the user's right ear, the right temple 136 configured to pivot about a right temple pivot axis 148 from an expanded position in which the right temple 136 is approximately 90 degrees relative to the right rim 26 to a collapsed position in which the right temple 136 is approximately parallel to the right rim 26.

Figure 12:
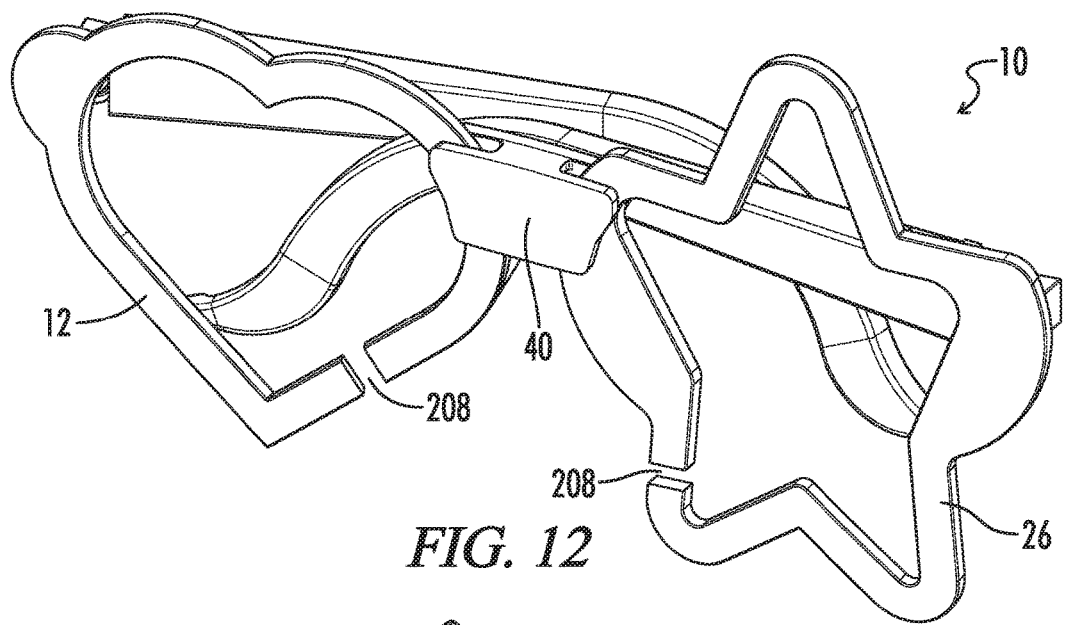
FIG. 12 illustrates a front, perspective view of a pair of interchangeable eyeglasses of another embodiment of the present invention.
Figure 13:
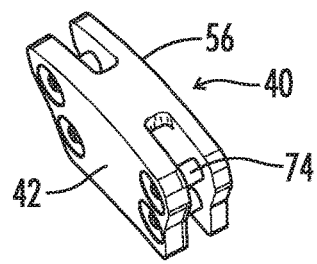
FIG. 13 illustrates, a side perspective view of the bridge of the pair of eyeglasses of FIG. 12.
Figure 14:
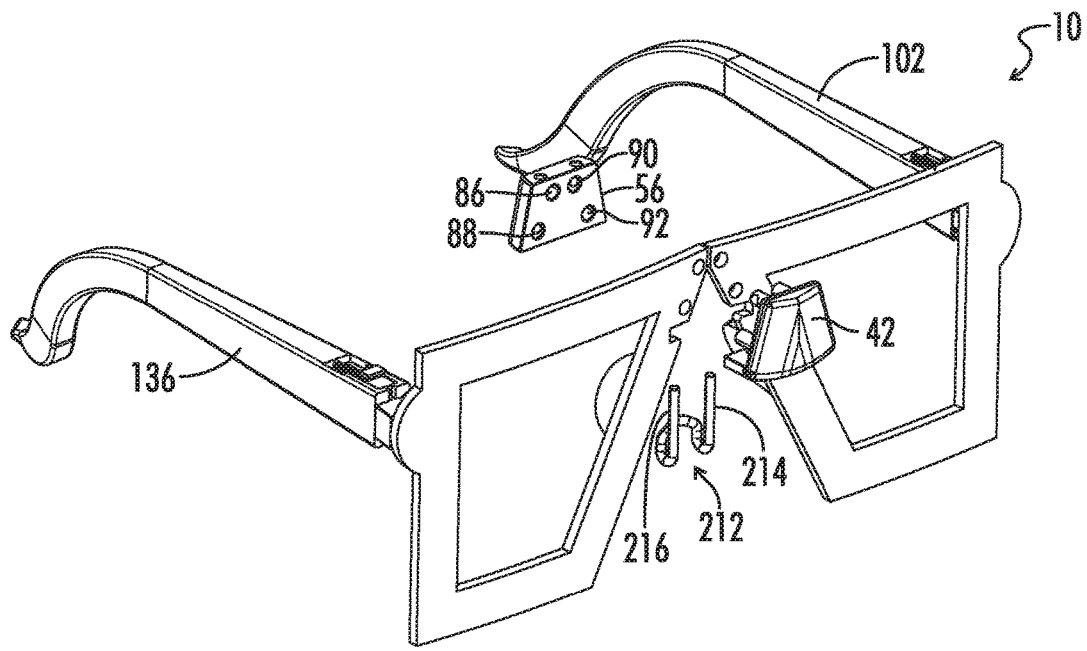
FIG. 14 illustrates a partially exploded front perspective view of a pair of interchangeable eyeglasses of another embodiment of the present invention.
Figure 15:
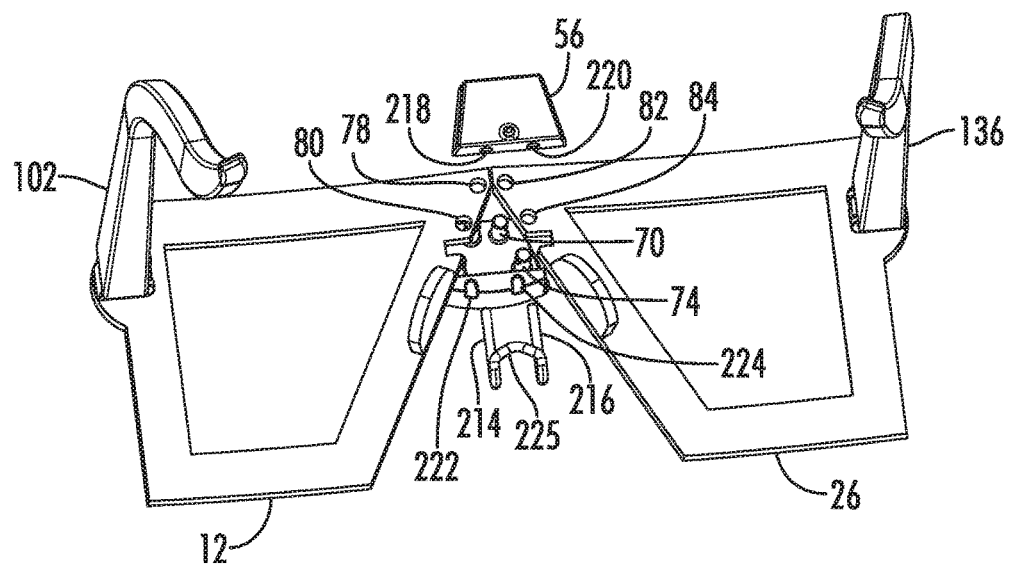
FIG. 15 illustrates a partially exploded rear perspective view of the pair of interchangeable eyeglasses of FIG. 14.
Figure 16:
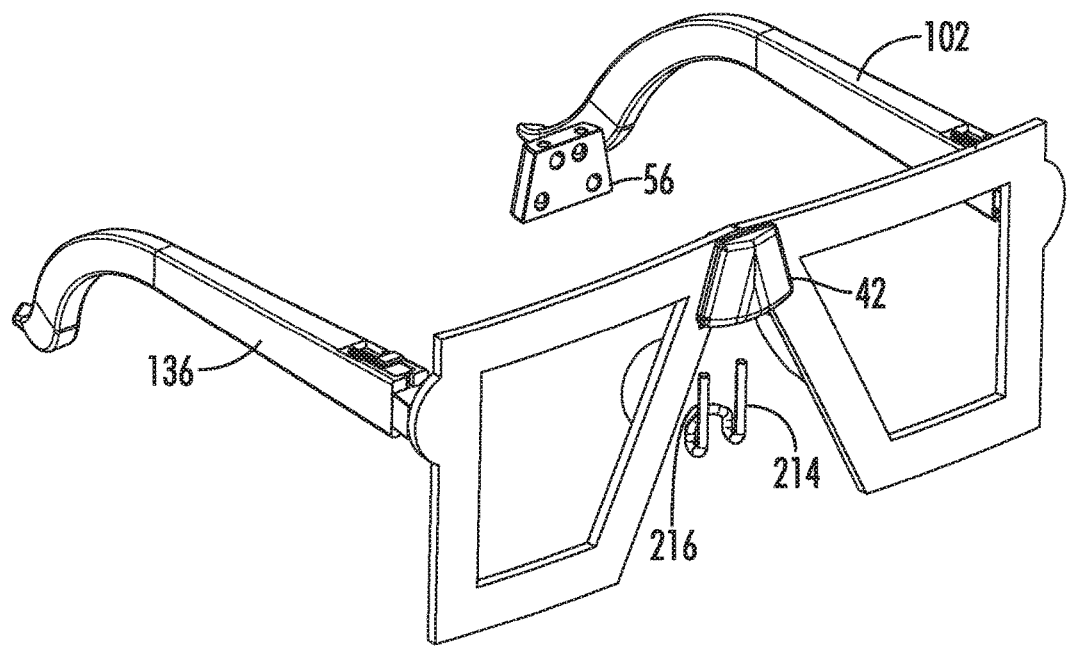
FIG. 16 illustrates a partially exploded front perspective view of the pair of interchangeable eyeglasses of FIG. 14.
Figure 17:
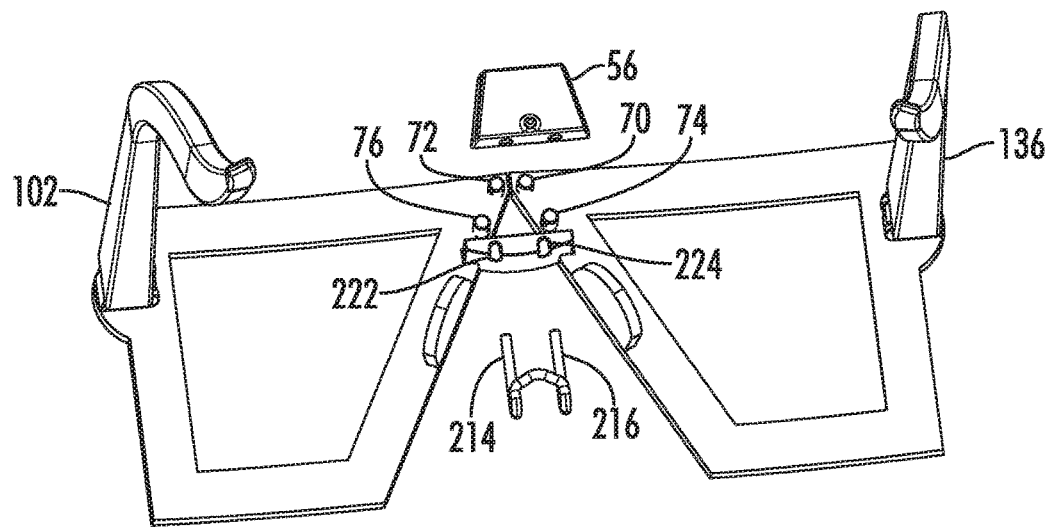
FIG. 17 illustrates a partially exploded rear perspective view of the pair of interchangeable eyeglasses of FIG. 14.
Figure 18:
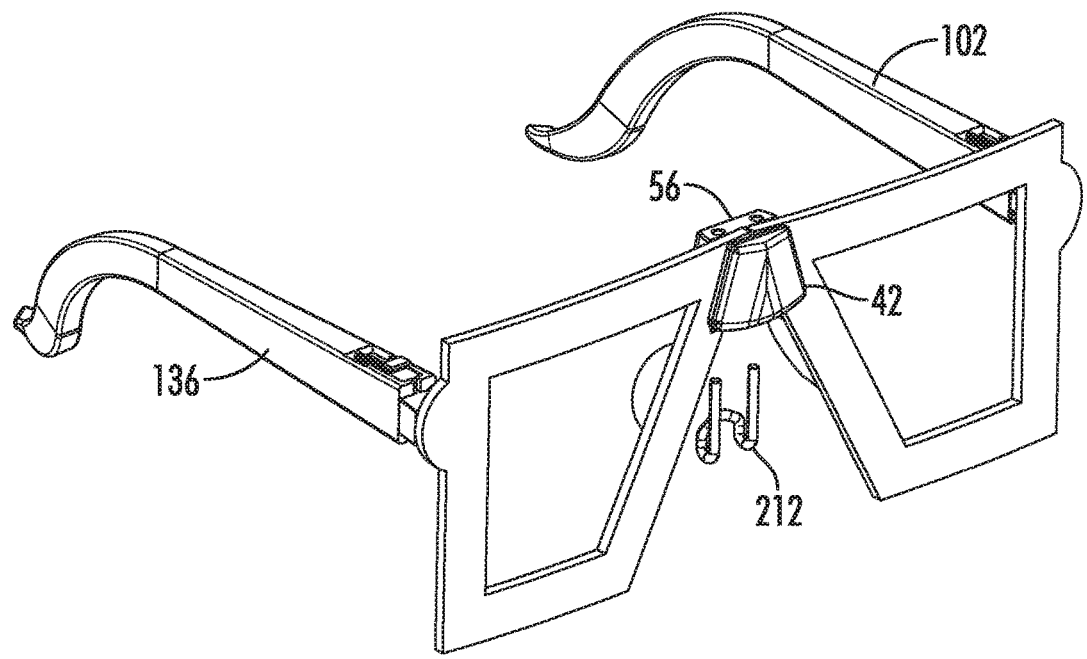
FIG. 18 illustrates a partially exploded front perspective view of the pair of interchangeable eyeglasses of FIG. 14.
Figure 19:
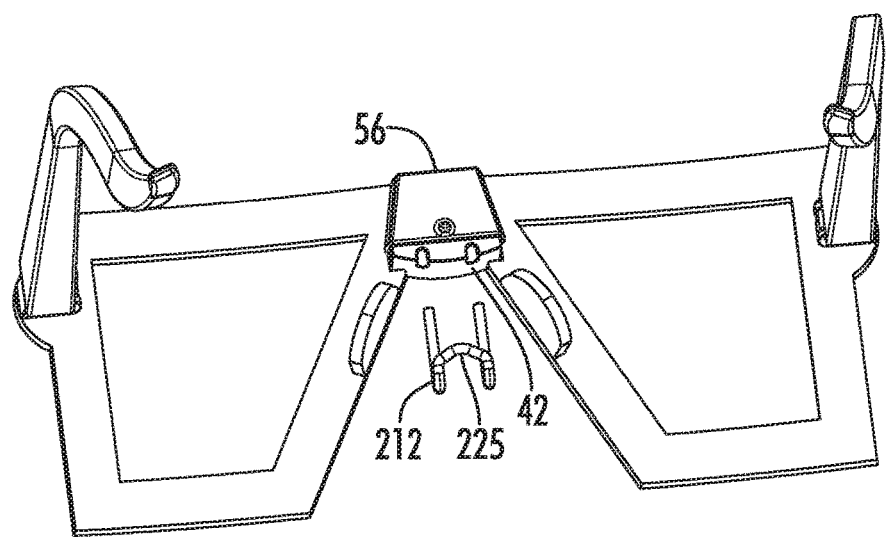
FIG. 19 illustrates a partially exploded rear perspective view of the pair of interchangeable eyeglasses of FIG. 14.
Figure 20:
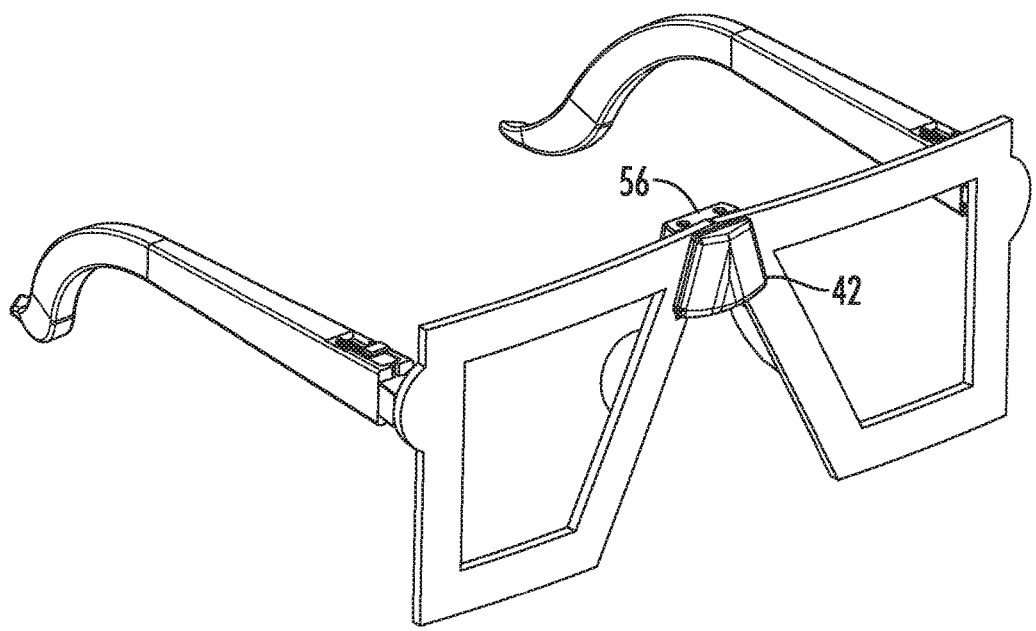
FIG. 20 illustrates an assembled front perspective view of the pair of interchangeable eyeglasses of FIG. 14.
Figure 21:
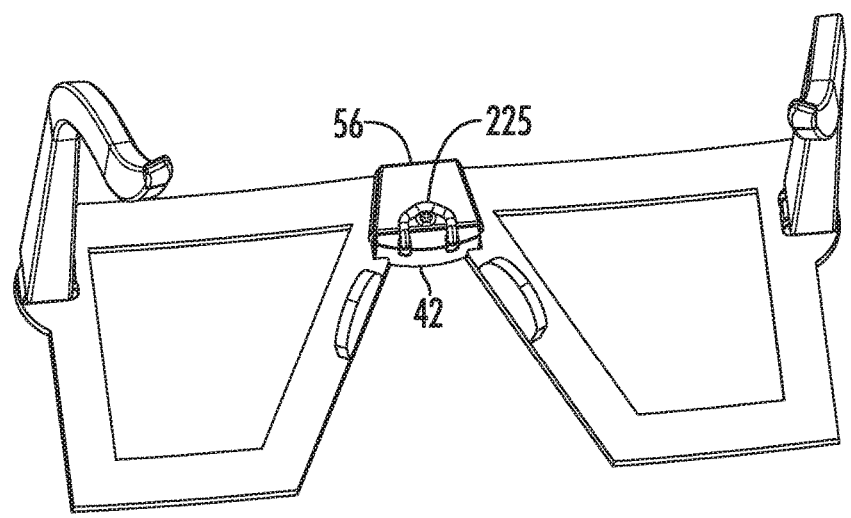
FIG. 21 illustrates an assembled rear perspective view of the pair of interchangeable eyeglasses of FIG. 14.

The bridge 40 optionally comprises a front piece 42 and a rear piece 56. In some embodiments, as shown in FIGS. 1-11, the entire front piece 42 is separable from the entire rear piece 56. In other embodiments, as shown in FIGS. 12-13, the centers of the front piece 42 and rear piece 56 are permanently connected and the left and right sides of the front piece 42 are removably connected to the left and right sides, respectively, of the rear piece 56. It has been observed that the embodiment of FIGS. 1-11 is more robust than the embodiment of FIGS. 12-13. However, either embodiment may be employed. More particularly, the left rim 12 is located between the front piece 42 of the bridge 40 and the rear piece 56 of the bridge 40 and the right rim 26 is located between the front piece 42 of the bridge 40 and the rear piece 56 of the bridge 40. In other words, the front piece 42 of the bridge 40 and the rear piece 56 of the bridge 40 sandwich the left rim 12 and right rim 26.

Figure 3:
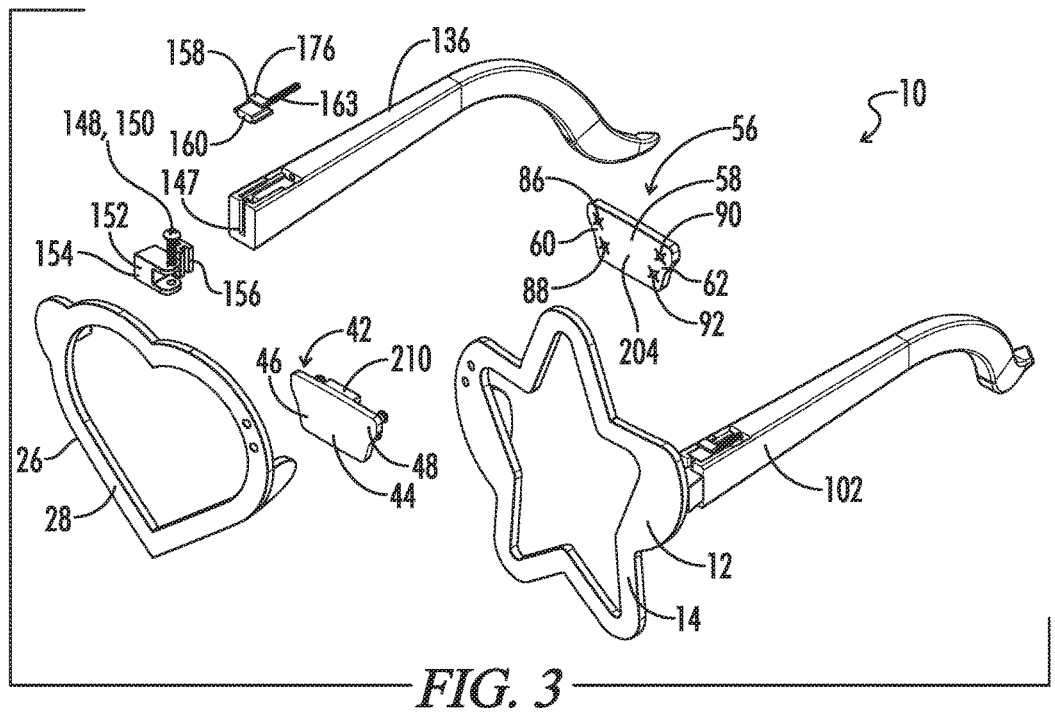
FIG. 3 illustrates a front, exploded, perspective view of the pair of interchangeable eyeglasses of FIG. 1.
Figure 4:
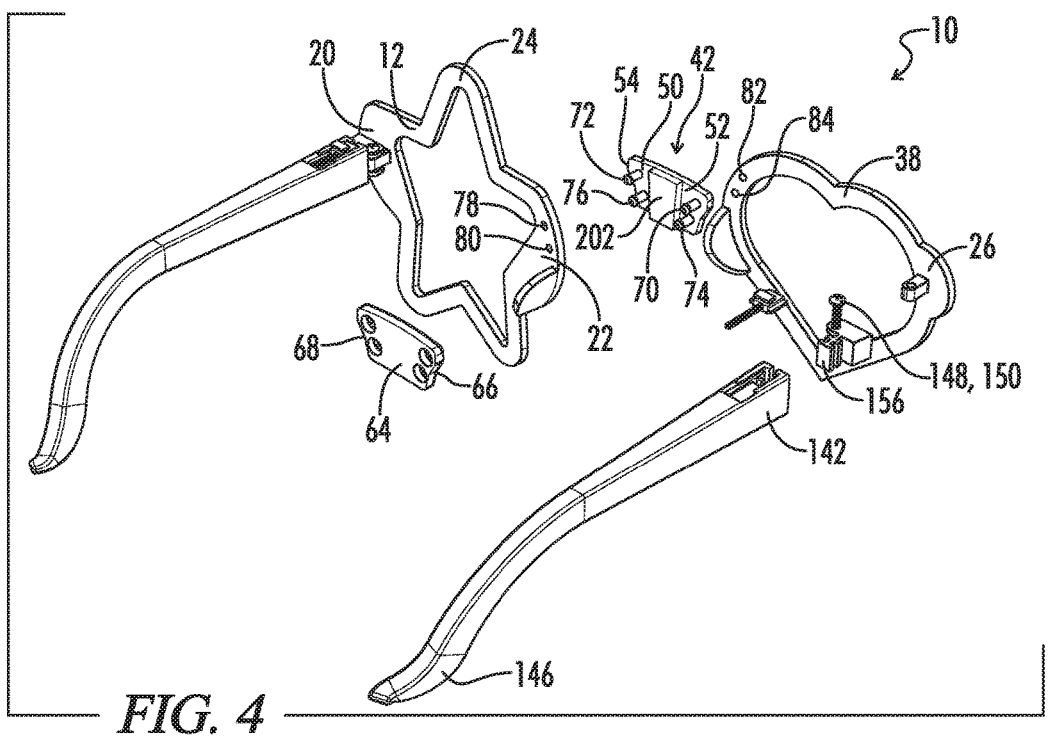
FIG. 4 illustrates a rear, exploded, perspective view of the pair of interchangeable eyeglasses of FIG. 1.
Figure 5:
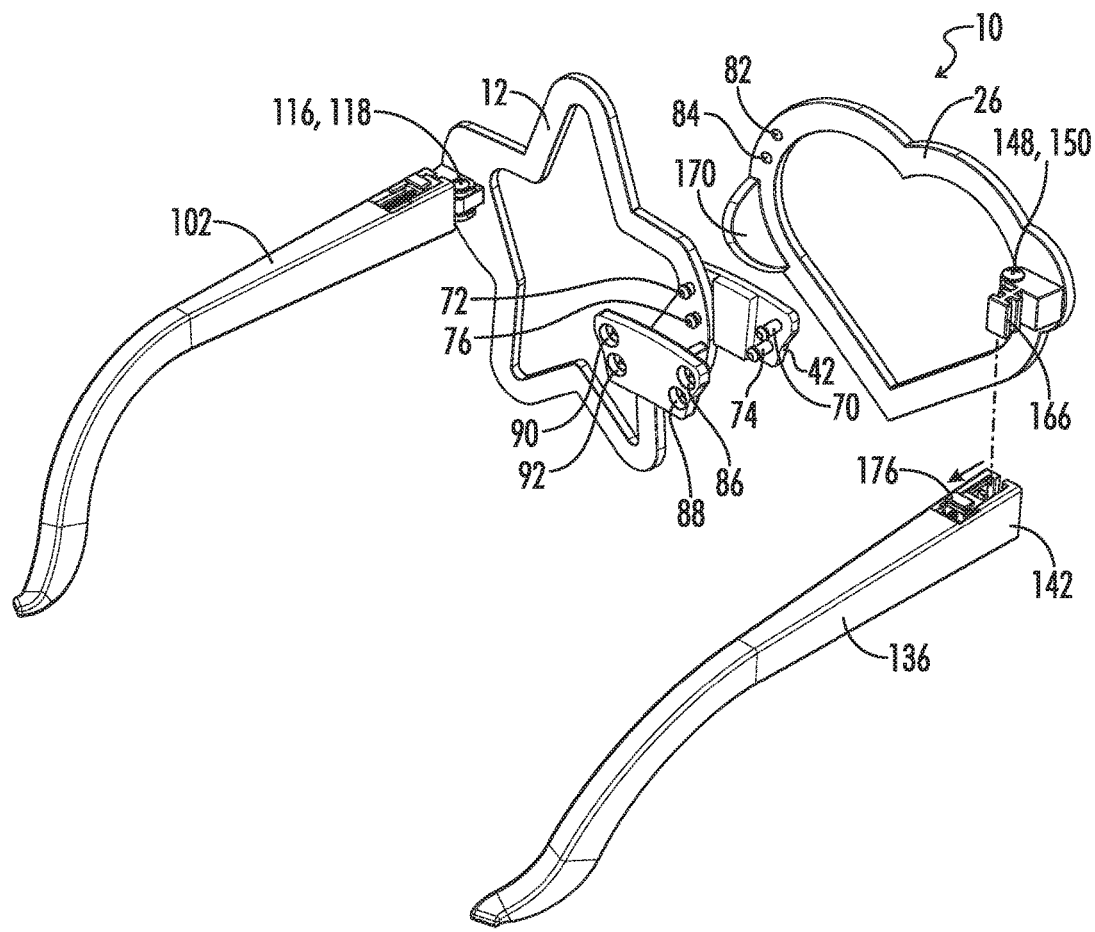
FIG. 5 illustrates another rear, exploded, perspective view of the pair of interchangeable eyeglasses of FIG. 1.
Figure 6:
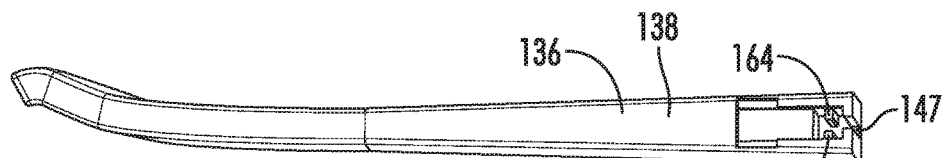
FIG. 6 illustrates a top, perspective view of the right temple of the pair of interchangeable eyeglasses of FIG. 1.
Figure 7:
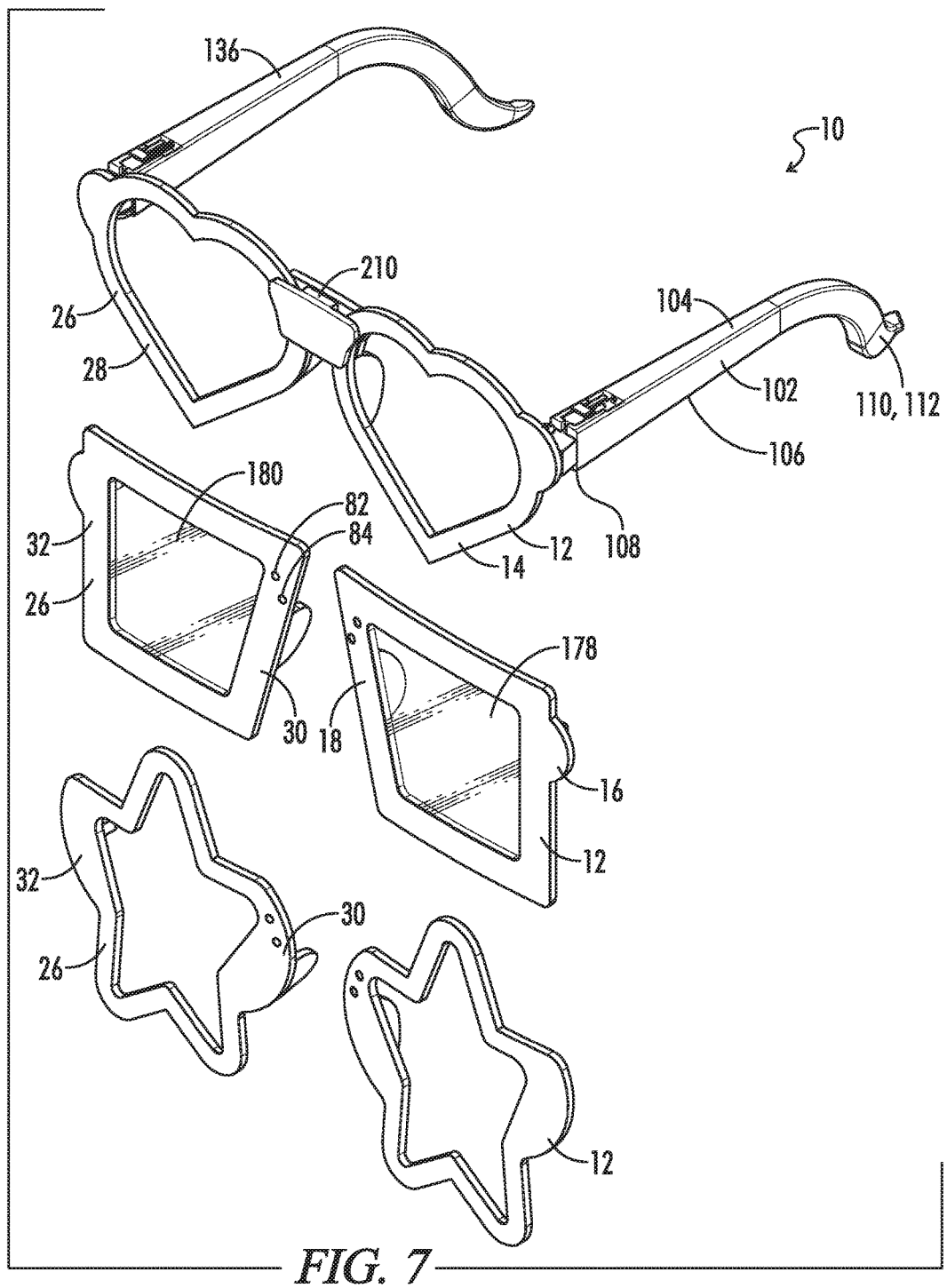
FIG. 7 illustrates a front, perspective view of a pair of interchangeable eyeglasses of another embodiment of the present invention; two pairs of rims are shown below the eyeglasses to show that they may be interchanged with the rims of the eyeglasses.
Figure 8:
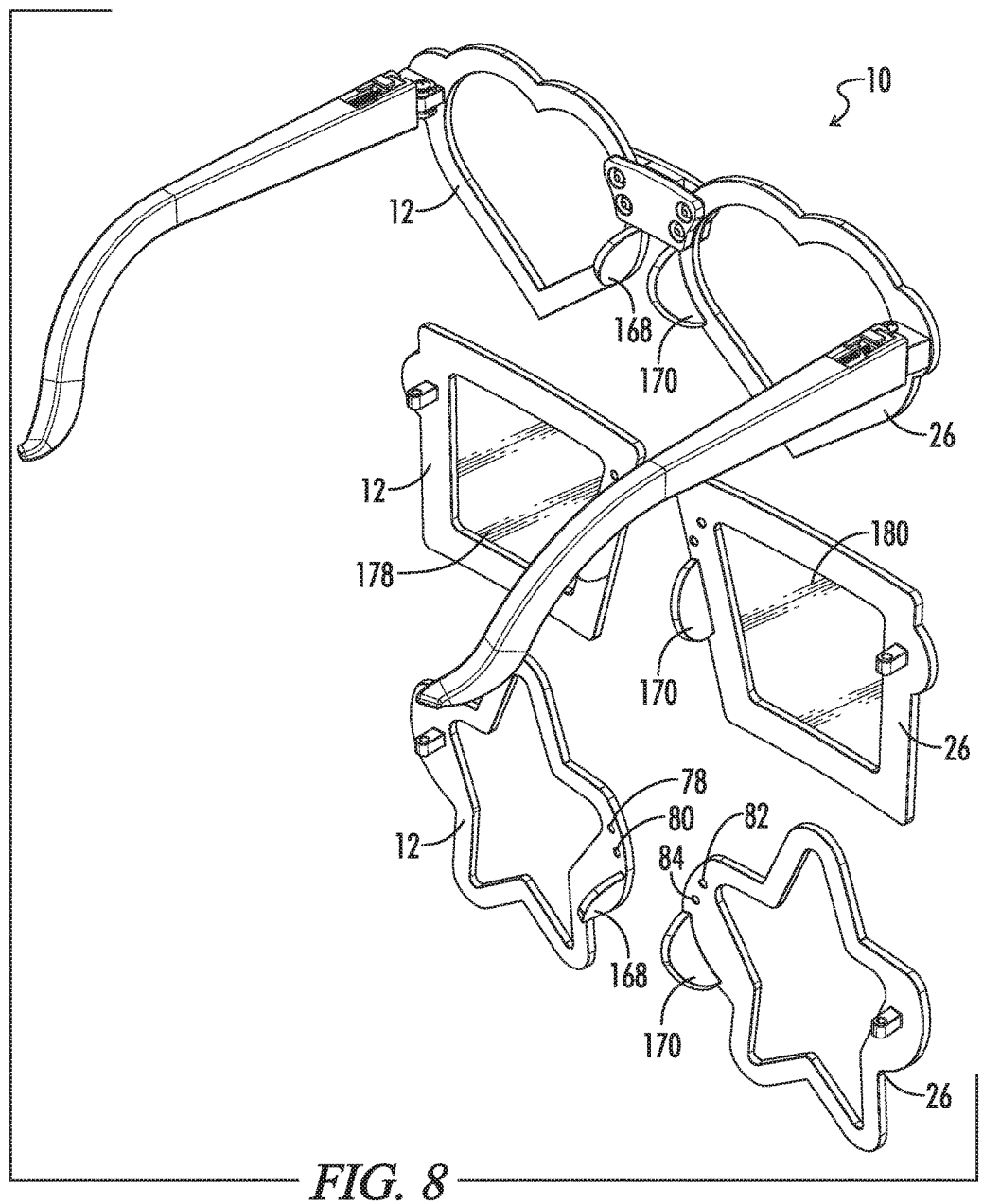
FIG. 8 illustrates a rear, perspective view of the pair of interchangeable eyeglasses and two pairs of rims of FIG. 7.

A mechanism for attaching and detaching the bridge 40 to the rims 12 and 26 without any tools will now be described in which four pegs 72, 74, 76 and 78 act as fasteners. More particularly, the front piece 42 of the bridge 40 comprises a front surface 44 comprising a lengthwise center 200 dividing the front surface 44 of the front piece 42 of the bridge 40 into a left side 48 and a right side 46 and a rear surface 50 comprising a lengthwise center 202 dividing the rear surface 50 of the front piece of the bridge 40 into a left side 54 and a right side 52, the rear surface 50 facing the rear piece 56 of the bridge 40, wherein the rear piece 56 of the bridge 40 comprises a front surface 58 comprising a lengthwise center 204 dividing the front surface 58 of the rear piece 56 into a left side 62 and a right side 60, the front surface 58 facing the front piece 42 of the bridge 40, and a rear surface 64 comprising a lengthwise center 206 dividing the rear surface 64 of the rear piece 56 into a left side 68 and a right side 66, wherein the left rim 12 comprises a left rim upper hole 78 extending through the left rim. 12 and a left rim lower hole 80 located below the left rim upper hole 78 and extending through the left rim 12, and the right rim 26 comprises a right rim upper hole 82 extending through the right rim 26 and a right rim lower hole 84 located below the right rim upper hole 82 extending through the right rim 26, wherein the rear piece 56 of the bridge 40 comprises a left side upper hole 90 and a left side lower hole 92 located below the left side upper hole 90, a right side upper hole 86 and a right side lower hole 88 below the right side upper hole 86, wherein the left side 54 of the rear surface 50 of the front piece 42 comprises a front piece left side upper peg 72 extending through the left rim upper hole 78 and through the left side upper hole 90, wherein the left side 54 of the rear surface 50 of the front piece 42 comprises a front piece left side lower peg 76 located below the front piece left side upper peg 72 and extending through the left rim lower hole 80 and through the left side lower hole 92, and further wherein the right side 52 of the rear surface 50 of the front piece 40 comprises a front piece right side upper peg 70 extending through the right rim upper hole 82 and through the right side upper hole 86 and a front piece right side lower peg 74 located below the front piece right side upper peg 70 and extending through the right rim lower hole 84 and through the right side lower hole 92. (It will be appreciated that when it is said that a component is located below another component, the lower component may be slightly offset from the upper component, as shown with for example the front piece right side piece upper and lower pegs 70 and 74 in FIGS. 4 and 5, as shown with the front piece left side upper and lower pegs 72 and 76 in FIG. 5, and as shown with the right side upper and lower holes 86 and 88 and left side upper and lower holes 90 and 92, as shown in FIGS. 3 and 5. Alternately, the left side upper and lower pegs 72 and 76 may be aligned vertically, as opposed to being offset, and the right side upper and lower pegs 70 and 74 may be aligned vertically, in which case left rim holes 78 and 80 will be aligned with each other vertically as will right rim holes 82 and 84). Thus, the front piece right side upper peg 70 and the front piece right side lower peg 74 act as two fasteners that connect the right side 52 of the rear surface 50 of the front piece 42 to the left side 30 of the front 28 of the right rim 26 and to the right side 60 of the front surface 58 of the rear piece 56, and the front piece left side upper peg 72 and the front piece left side lower peg 76 act as two fasteners that connect the left side 54 of the rear surface 50 of the front piece 42 to the right side 18 of the front 14 of the left rim 12 and to the left side 62 of the front surface 58 of the rear piece 56. Optionally, the holes 86, 88, 90 and 92 are generally circular and the pegs 70, 72, 74 and 76 fit into the holes 86, 88, 90 and 92 via a friction fit.

Figure 9:
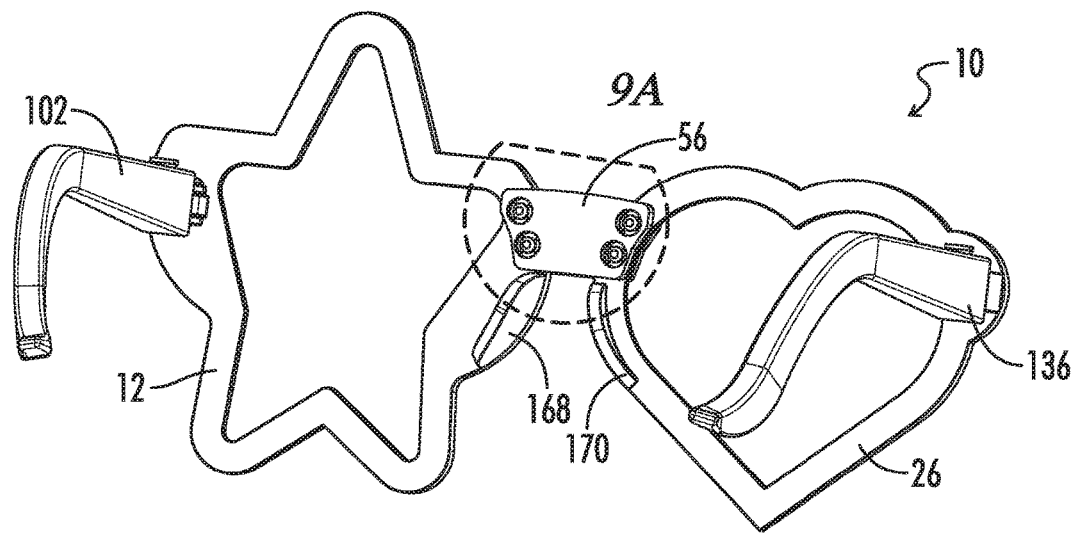
FIG. 9 illustrates another rear, perspective view of the pair of interchangeable eyeglasses of FIG. 1.
Figure 9A:
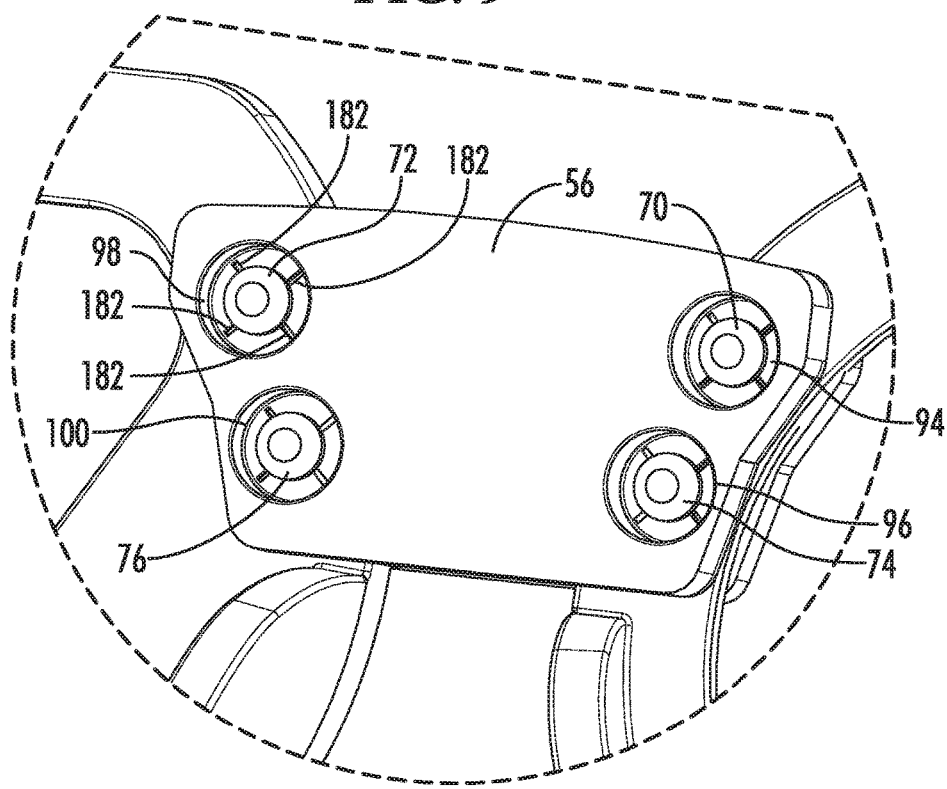
FIG. 9A illustrates a close-up, rear perspective view of the circled area labelled 9A in FIG. 9 showing the pegs and rear piece of the bridge of the pair of interchangeable eyeglasses of FIG. 9.
Figure 10:
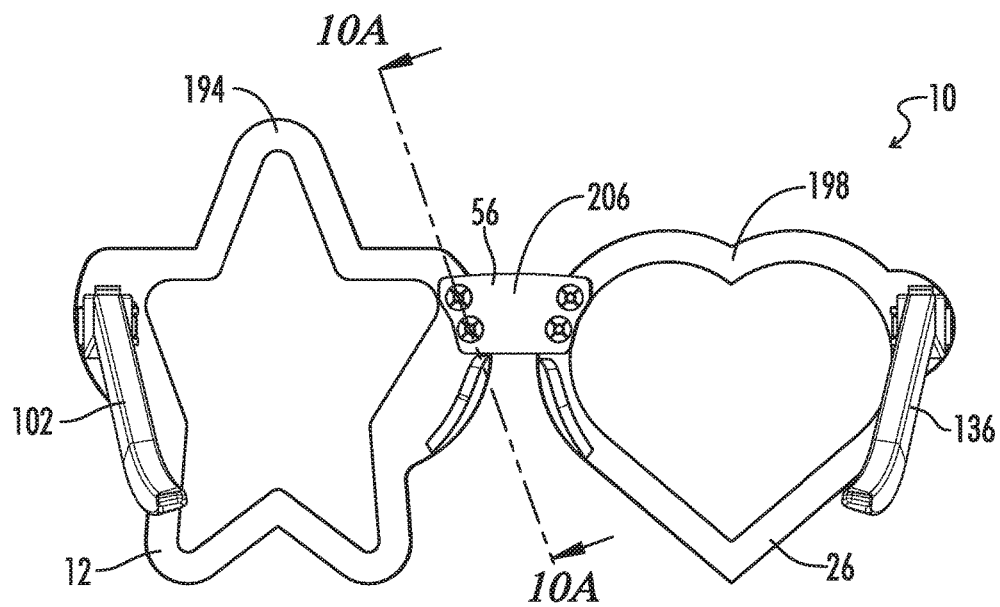
FIG. 10 illustrates another rear, perspective view of the pair of interchangeable eyeglasses of FIG. 1.
Figures 10A, 10B:
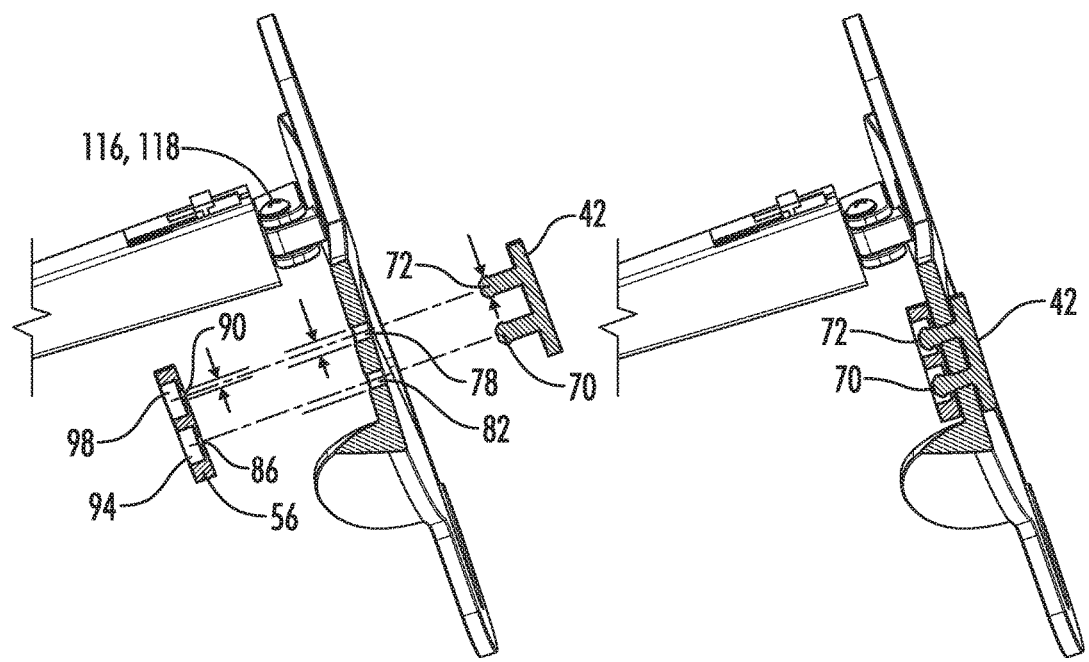
FIGS. 10A and 10B illustrate cross-sectional views of the pair of interchangeable eyeglasses of FIG. 10, taken along line 10A-10A in FIG. 10.
Figure 11:
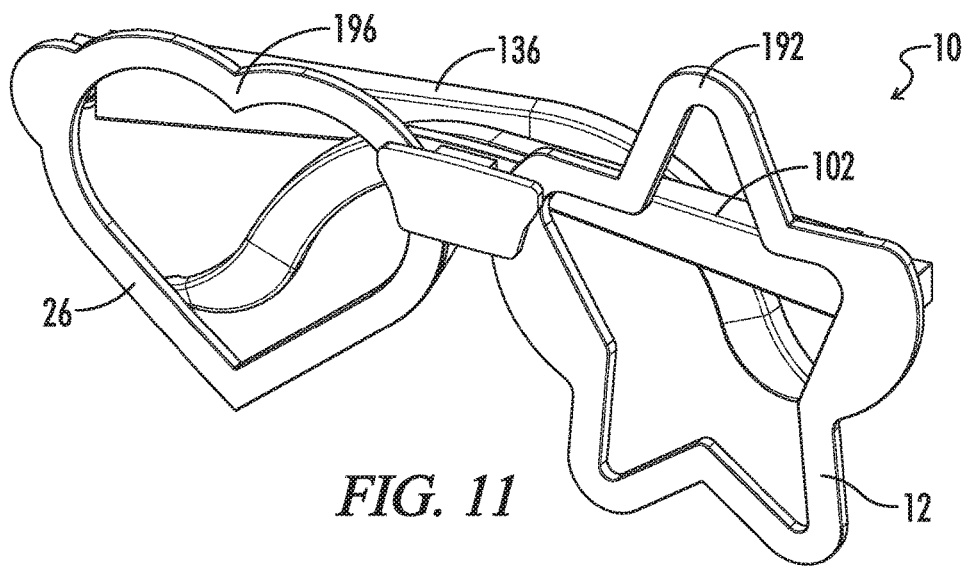
FIG. 11 illustrates a front, perspective view of the pair of interchangeable eyeglasses of FIG. 1.

The pegs 70, 72, 74 and 76 and the holes 78, 80, 82, and 84 each have a width (more particularly, a diameter if the pegs 70, 72, 74 and 76 are cylindrical) and, optionally, as shown in FIG. 10A, the widths of the pegs 70, 72, 74, and 76, at their widest points, are greater than the widths of the holes 78, 80, 82 and 84 in the rear piece 56 of the bridge 40 to create the friction fit. Optionally, each hole 78, 80, 82, and 84 is connected to a plurality of slits 182 that are spaced substantially evenly about the circumferences of the holes 78, 80, 82, and 84, as best in FIG. 9A, which allow the oversized pegs 70, 72, 74 and 76 to pass through the holes 86, 88, 90 and 92.

Optionally, the holes 78, 80, 82 and 84 in the rear piece 56 of the bridge 40 are each located in a recess 94, 96, 98 and 100. It will also be appreciated that, although not shown, the pegs 70, 72, 74 and 76 can be located on the front surface 58 of the rear piece 56 of the bridge 40, in which case, the holes 78, 80, 82 and 84 will be located in the front piece 42 of the bridge 40. Regardless of whether the pegs 70, 72, 74 and 76 are located on the front piece 42 or the rear piece 56, the pair of eyeglasses 10 may only have one peg located on the right side and one peg located on the left side (instead of two pegs located on each side), however, it has been observed that having only one peg per side makes the glasses 10 less stable and thus, two pegs located on each side, as described above and shown in the Figures is more desirable.

When it is said that the bridge 40 is configured to rest above the human user's nose, it will be understood that the bridge 40 is directly above all or substantially all of the user's nose, it being understood that humans have different shaped noses. The front bridge 40 piece includes a top 184 and a bottom 186 and the rear piece 56 includes a top 188 and a bottom 190. Preferably the bottom 186 of the front piece 40, the bottom 190 of the rear piece 56 (or both the bottom 184 of the front piece 40 and the bottom 190 of the rear piece 56) is generally flat, as shown in FIGS. 1-13.

Preferably, the left rim 12 and right rim 26 form a substantially closed shape, e.g., full star, fall generally rectangular pieces, and full hearts (as shown in FIGS. 1, 2, 3, 4, 5, 7, 8, 9, 10, and 11). It being understood that "full" means a border without any gaps. However, it will be understood that other shapes are possible, including rims 12 and 26 with gaps 208, as shown in FIG. 12.

Optionally, the bridge 40 is comprised of an elastomeric material, e.g., a rubber. The bridge 40 may be any suitable shape.

Optionally, the rear surface 50 of the front piece 42 includes a centrally spaced rectangular protrusion 210 that acts as a spacer between the left and right rims 12 and 26.

Optionally, the left temple 102 is configured to disconnect from the left rim 12 without any tools, and the right temple 136 is configured to disconnect from the right rim 26 without any tools. Optionally, the bridge 40 is the sole point of connection between the left rim 12 and right rim 26.

A spring-loaded locking mechanism in which the temples 102 and 136 are connected to the rims 12 and 26 will now be explained. It will be appreciated that although only the locking mechanism of the right temple 136 is shown and described below, the left temple 102 includes an identical locking mechanism. More particularly, the pair of interchangeable eyeglasses 10 further includes a right hinge piece 152 comprising a right pin 150 forming the right temple pivot axis 148, the right hinge piece 152 connecting the right temple 136 to the right rim 26, the right hinge piece 152 comprising a front end 154 attached to the right side 36 of the rear 33 of the right rim 26 and a rear end 156 removably attached to the right temple 136, wherein the front end 142 of the right temple 136 comprises a right temple groove 147 extending from the top 138 of the right temple 136 downward, the right temple groove 147 not extending to the bottom 140 of the right temple 136, the front end 142 of the right temple 136 further comprising a right temple lid 158 located at the top 138 of the right temple 136, the right temple lid 158 having a front end 160 and a rear end 162, the right temple lid 158 having a closed position in which the right temple lid 158 covers the right hinge piece 152 and prevents the right hinge piece 152 from detaching from the right temple 136 and an open position in which the right temple lid 158 does not cover the right hinge piece 152 and allows the right hinge piece 152 to detach from the right temple 136, the right temple lid 158 configured to slide along the top 138 of the right temple 136 from the closed position to the open position, the rear end 162 of the right temple lid 158 connected to a right temple spring 163 configured to bias the right temple lid 158 in the closed position.

Figure 2:
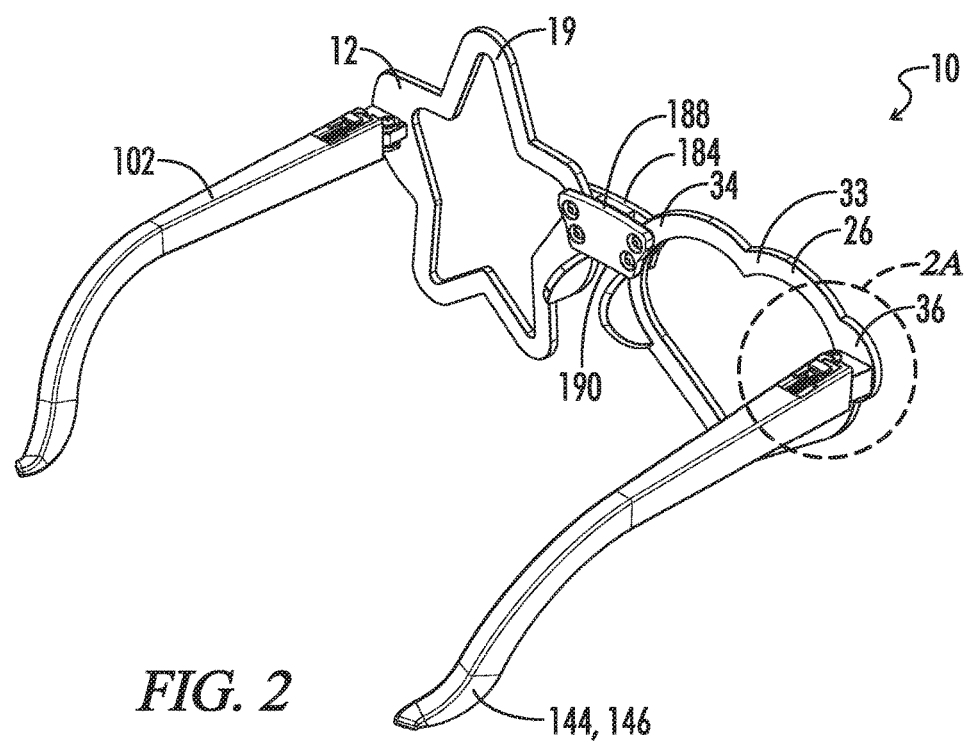
FIG. 2 illustrates a rear, perspective view of the pair of interchangeable eyeglasses of FIG. 1.
Figure 2A:
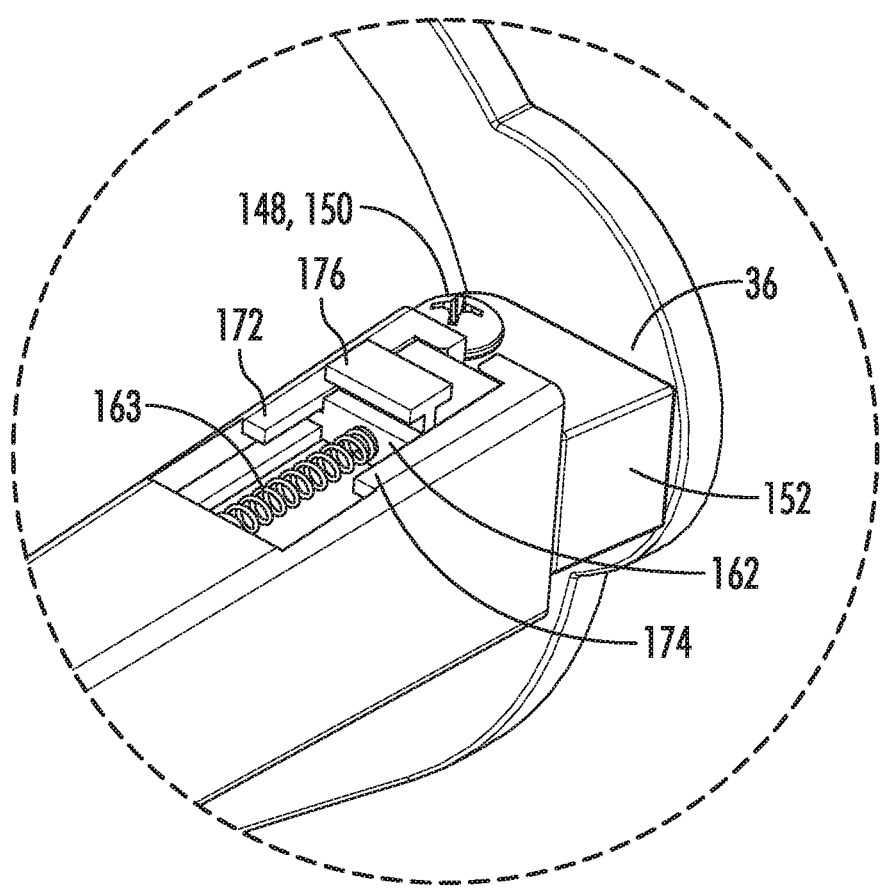
FIG. 2A illustrates a close-up, rear perspective view of the circled area labelled 2A in FIG. 2 showing the right lid of the pair of interchangeable eyeglasses of FIG. 2.

Optionally, the right temple 136 and right hinge piece 152 comprise mating teeth 164 and 166. Optionally, the right temple 136 includes a left flange 172 and right flange 174 that serve as tracks to guide the right temple lid 158 as well as a handle 176, as best seen in FIG. 2.4.

Optionally, the bridge 40 is generally rectangular in shape. Optionally, the pair of interchangeable eyeglasses 10 further includes a sloped left nose pad 168 attached to the left rim 12 and configured to rest against the left side of the user's nose and a sloped right nose pad 170 attached to the right rim 26 and configured to rest against the right side of the user's nose. Optionally, the pair of interchangeable eyeglasses 10 further includes a left lens 178 located in the left rim 12 and a right lens 180 located in the right rim 26.

Optionally, the right rim 26 comprises a top surface 38 having a first shape and the left rim 12 comprises a top surface 24 having a second shape, the first shape different than the second shape (i.e., the rims 12 and 26 have different shapes, as shown in FIGS. 1-5, 9, 10, 11 and 12). It will also be appreciated that the rims 12 and 26 can have a variety of shapes, including various geometric shapes, letters and numbers (in the case of for example New Year's glasses). Optionally, the pair of interchangeable eyeglasses 10 is comprised of plastic (e.g., every component except possibly the right temple spring 163, left temple and right temple pins 118 and 150 and lenses 178 and 180 are plastic). For example, the plastic components may comprise 90-100% of the weight of the pair of eyeglasses 10. In other embodiments, metal components comprise 90-100% of the weight of the pair of eyeglasses 10.

The present disclosure also provides a method of wearing a pair of interchangeable eyeglasses 10 by a human user comprising the steps of;
 a) providing the pair of interchangeable eyeglasses 10;
 b) positioning the bridge 40 above the human user's nose;
 c) positioning the left rim 12 in front of the human user's left eye;
 d) positioning the right rim 26 in front of the human user's right eye;
 e) positioning the left temple tip 112 around the human user's left ear; and
 f) positioning the right temple tip 146 around the human user's right ear.

The present disclosure also provides a method of wearing a pair of interchangeable eyeglasses 10 by a human user comprising the steps of:
 a) providing the pair of interchangeable eyeglasses 10, wherein the left rim 12 has a first shape and the right rim 26 has a second shape;
 b) disconnecting the left rim 12 from the left temple 102 and disconnecting the right rim 26 from the right temple 136; and
 c) connecting a left rim 12 having a third shape to the left temple 102 and connecting a right rim 26 having a fourth shape to the right temple 136, wherein the first shape is different than the third shape and wherein the second shape is different than the fourth shape. Optionally, the first shape is different than the second shape and the third shape is different than the fourth shape.

Optionally, the method further includes: d) positioning the bridge 40 above the human user's nose; e) positioning the left rim 12 in front of the human user's left eye; f) positioning the right rim 26 in front of the human user's right eye; g) positioning the left temple tip 112 around the human user's left ear; and h) positioning the right temple tip 146 around the human user's right ear.

The Embodiments of FIGS. 14-33

Figure 22:
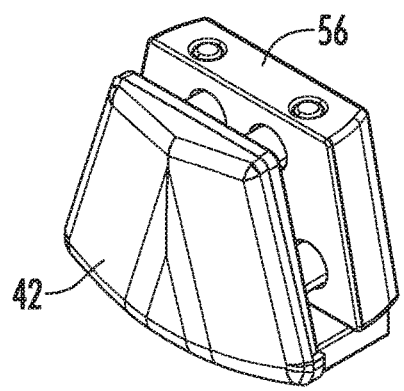
FIG. 22 illustrates an assembled, front perspective view of the bridge of the pair of interchangeable eyeglasses of FIG. 14.
Figure 23:
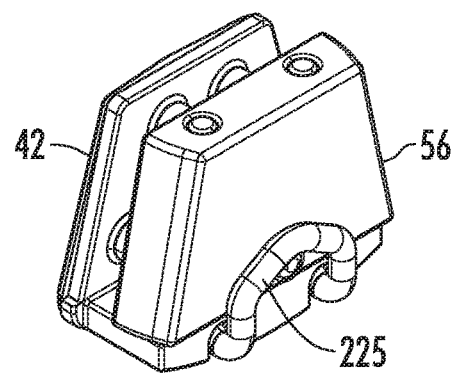
FIG. 23 illustrates an assembled rear perspective view of the bridge of the pair of interchangeable eyeglasses of FIG. 14.
Figure 24:
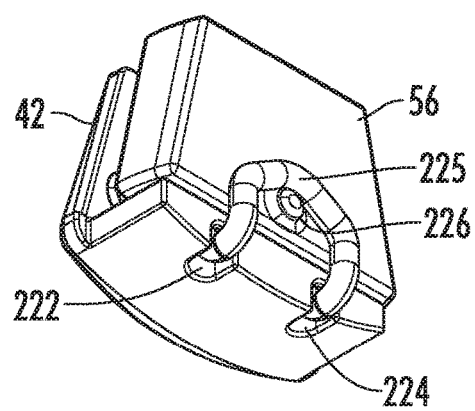
FIG. 24 illustrates an assembled bottom perspective view of the bridge of the pair of interchangeable eyeglasses of FIG. 14.
Figure 25:
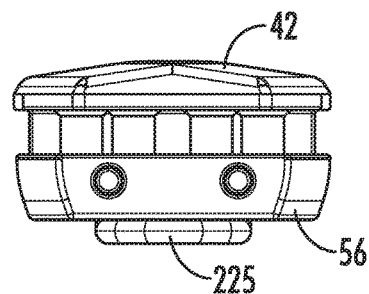
FIG. 25 illustrates an assembled top plan view of the bridge of the pair of interchangeable eyeglasses of FIG. 14.
Figure 26:
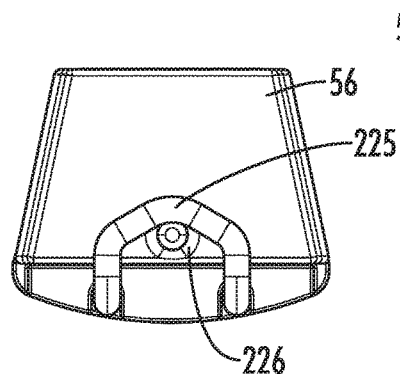
FIG. 26 illustrates an assembled rear elevation view of the bridge of the pair of interchangeable eyeglasses of FIG. 14.
Figure 27:
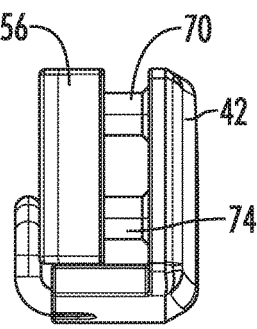
FIG. 27 illustrates an assembled side elevation view of the bridge of the pair of interchangeable eyeglasses of FIG. 14.
Figure 28:
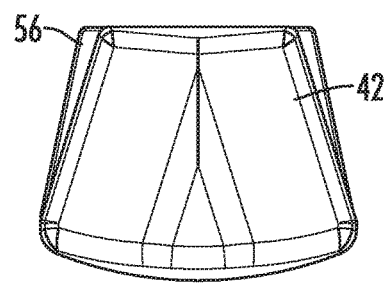
FIG. 28 illustrates an assembled front elevation view of the bridge of the pair of interchangeable eyeglasses of FIG. 14.
Figure 29:
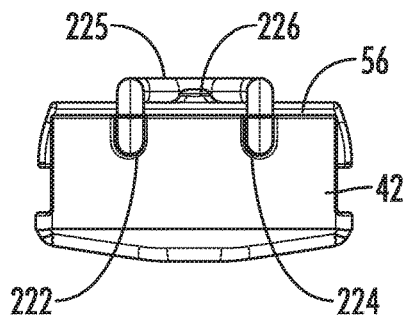
FIG. 29 illustrates an assembled bottom plan view of the bridge of the pair of interchangeable eyeglasses of FIG. 14.
Figure 30:
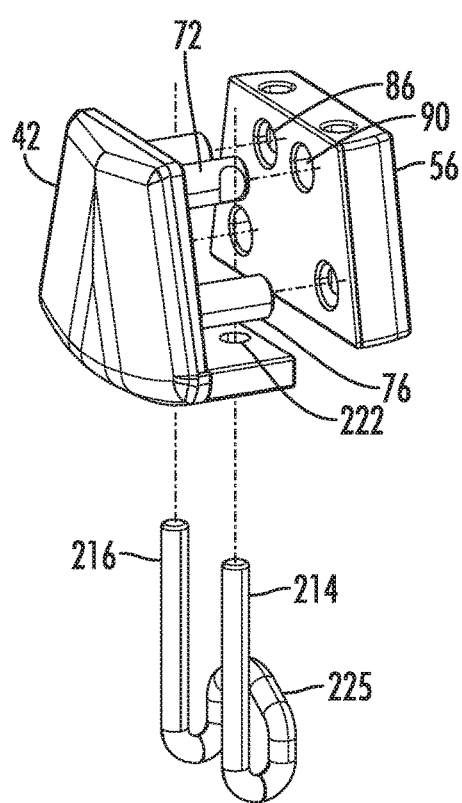
FIG. 30 illustrates an exploded side perspective view of the bridge of the pair of interchangeable eyeglasses of FIG. 14.
Figure 31:
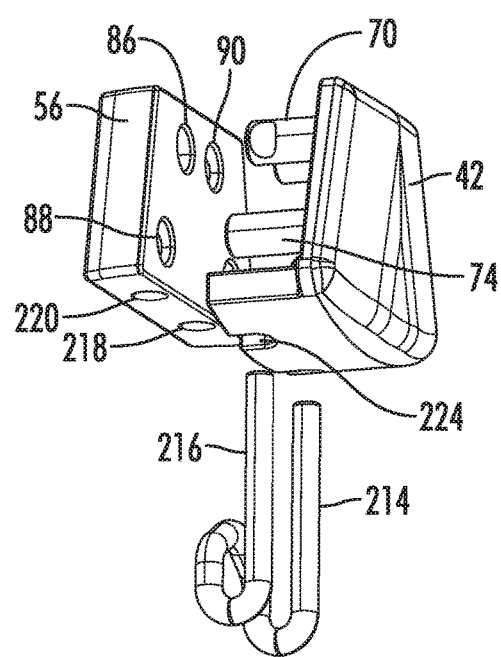
FIG. 31 illustrates an exploded side perspective view of the bridge of the pair of interchangeable eyeglasses of FIG. 14.

FIGS. 14-31 show an alternate embodiment of the pair of interchangeable eyeglasses 10. The primary difference is that in addition to the pegs 78, 80, 82 and 84, the pair of interchangeable eyeglasses 10 includes a removable pin 212 to further secure the front piece 42 of the bridge 40 to the rear piece 56 of the bridge 40. The removable pin 212 may include one or more posts 214 and 216 that extend vertically and generally perpendicular to the pegs 78, 80, 82 and 84. More particularly, in the embodiment illustrated in FIGS. 14-31, the pin 212 may include a left post 214 that is placed through a left post hole 218 in the rear piece 56 and through a left post hole 222 in the front piece 42, as well as a right post 216 that is placed through a right post hole 220 in the rear piece 56 and through a right post hole 224 in the front piece 42 in order to farther secure the front piece 42 of the bridge 40 to the rear piece 56 of the bridge 40. The pin 212 may include an arc-shaped bar 225 that rests on a bump 226 located on the rear piece 56. The bottoms of the front piece 42 and the bottom of the rear piece 56 may overlap as best seen in FIGS. 22-24. As opposed to extending vertically upward through post holes 220, 224 in the front piece 42 and the rear piece 56, the posts 214 and 218 may extend downward (not shown) through post holes in the front piece 42 and the rear piece 56. In an exemplary embodiment, as shown by the arrows in FIG. 30, the left post 214 may be captured between upper left peg 72 and lower left peg 76, if the pegs are offset, and the right post 216 may be similarly captured between upper right peg 70 and lower right peg 74.

Figure 32:
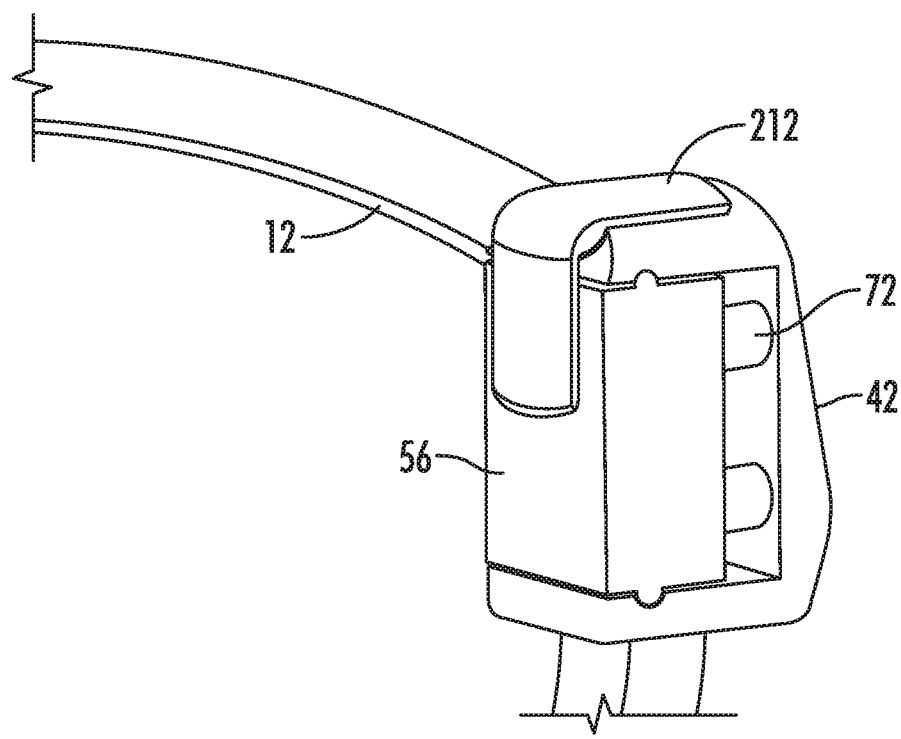
FIG. 32 illustrates a side perspective view of an alternate embodiment of a bridge for use with the interchangeable eyeglasses of the present disclosure; only the left side of the bridge is shown.
Figure 33:
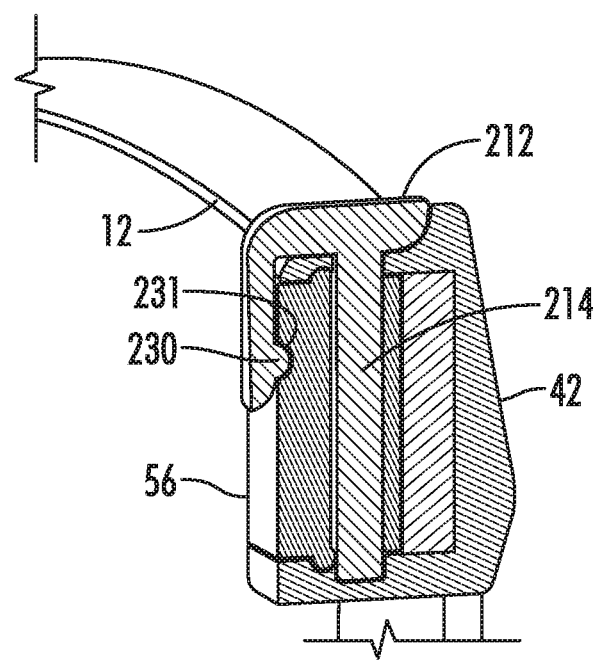
FIG. 33 illustrates a cross-sectional view of the bridge of FIG. 32.

FIGS. 32 and 33 show are variation of the design with the pin 212 including a bulge 230 that mates into a recess 231 in the rear piece 56.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A pair of interchangeable eyeglasses comprising:
 a) a left rim comprising a front having a lengthwise center dividing the front of the left rim into a left side and a right side, and a rear having a lengthwise center dividing the rear of the left rim into a left side and a right side;
 b) a right rim comprising a front having a lengthwise center dividing the front of the right rim into a left side and a right side, and a rear having a lengthwise center dividing the rear of the right rim into a left side and a right side;
 c) a bridge located between the left rim and the right rim and connecting the right rim to the left rim, the bridge removably attached to the left rim and the right rim, the bridge comprising a front piece having a front surface having a lengthwise center dividing the front surface of the front piece into a left side and a right side and a rear surface having a lengthwise center dividing the rear surface of the front piece into a left side and a right side, and a rear piece having a front surface having a lengthwise center dividing the front surface of the rear piece into a left side and a right side and a rear surface having a lengthwise center dividing the rear surface of the rear piece into a left side and a right side, the front surface of the rear piece facing the rear surface of the front piece, the left side of the rear surface of the front piece removably attached to the right side of the front of the left rim and the left side of the front surface of the rear piece by at least one left fastener and the right side of the rear surface of the front piece removably attached to the left side of the front of the right rim and the right side of the front surface of the rear piece by at least one right fastener;

d) a left temple comprising a top, a bottom, a front end removably connected to the left side of the rear of the left rim and a rear end comprising a curved temple tip, the left temple configured to pivot about a left temple pivot axis from an expanded position in which the left temple is approximately 90 degrees relative to the left rim to a collapsed position in which the left temple is approximately parallel to the left rim; and e) a right temple comprising a top, a bottom, a front end removably connected to the right side of the rear of the right rim and a rear end comprising a curved temple tip, the right temple configured to pivot about a right temple pivot axis from an expanded position in which the right temple is approximately 90 degrees relative to the right rim to a collapsed position in which the right temple is approximately parallel to the right rim;

wherein the left rim is located between the rear surface of the front piece of the bridge and the front surface of the rear piece of the bridge and further wherein the right rim is located between the rear surface of the front piece of the bridge and the front surface of the rear piece of the bridge, wherein the left rim comprises a lateral hole extending through the left rim and the right rim comprises a lateral hole extending through the right rim, wherein the left side of the rear surface of the front piece comprises a left peg extending through the lateral hole in the left rim and engaging the left side of the front surface of the rear piece, and further wherein the right side of the rear surface of the front piece comprises a right peg extending through the lateral hole in the right rim and engaging the front surface of the right side of the rear piece, and further wherein the at least one left fastener comprises the left peg and the at least one right fastener comprises the right peg, wherein the front piece and rear piece each comprise a vertical hole oriented generally perpendicular to the lateral holes, and further wherein the bridge further comprises a removable pin comprising a vertical post comprising a proximal segment extending through the vertical holes in the front piece and the rear piece and removably connecting the front piece to the rear piece and a distal segment located between the rear surface of the front piece and the front surface of the rear piece, the vertical post oriented generally perpendicular to the left peg and the right peg.

2. The pair of interchangeable eyeglasses of claim 1, wherein the left temple is configured to disconnect from the left rim without any tools, and further wherein the right temple is configured to disconnect from the right rim without any tools.

3. The pair of interchangeable eyeglasses of claim 1, wherein the bridge is the sole point of connection between the left rim and right rim.

4. The pair of interchangeable eyeglasses of claim 1, wherein the bridge is comprised of an elastomeric material.

5. The pair of interchangeable eyeglasses of claim 1 further comprising a left hinge piece comprising a left pin forming the left temple pivot axis, the left hinge piece connecting the left temple to the left rim, the left hinge piece comprising a front end attached to the rear of the left side of the left rim and a rear end removably attached to the left temple, wherein the front end of the left temple comprises a left temple groove extending from the top of the left temple downward, the left temple groove not extending to the bottom of the left temple, the front end of the left temple further comprising a left temple lid located at the top of the left temple, the left temple lid having a front end and a rear end, the left temple lid having a closed position in which the left temple lid covers the rear end of the left hinge piece and prevents the left hinge piece from detaching from the left temple and an open position in which the left temple lid does not cover the rear end of the left hinge piece and allows the left hinge piece to detach from the left temple, the left temple lid configured to slide along the top of the left temple from the closed position to the open position, the rear end of the left temple lid connected to a left temple spring configured to bias the left temple lid in the closed position.

6. The pair of interchangeable eyeglasses of claim 5 wherein the front end of the left temple and the rear end of the left hinge piece comprise mating teeth.

7. The pair of interchangeable eyeglasses of claim 5 further comprising a right hinge piece comprising a right pin forming the right temple pivot axis, the right hinge piece connecting the right temple to the right rim, the right hinge piece comprising a front end attached to the rear of the right side of the right rim and a rear end removably attached to the right temple, wherein the front end of the right temple comprises a right temple groove extending from the top of the right temple downward, the right temple groove not extending to the bottom of the right temple, the front end of the right temple further comprising a right temple lid located at the top of the right temple, the right temple lid having a front end and a rear end, the right temple lid having a closed position in which the right temple lid covers the rear end of the right hinge piece and prevents the right hinge piece from detaching from the right temple and an open position in which the right temple lid does not cover the rear end of the right hinge piece and allows the right hinge piece to detach from the right temple, the right temple lid configured to slide along the top of the right temple from the closed position to the open position, the rear end of the right temple lid connected to a spring configured to bias the spring loaded lid in the closed position.

8. The pair of interchangeable eyeglasses of claim 1 further comprising a left nose pad attached to the left rim and configured to rest against the left side of the human user's nose and a right nose pad attached to the right rim and configured to rest against the right side of the human user's nose.

9. The pair of interchangeable eyeglasses of claim 1 further comprising a left lens located in the left rim and a right rim located in the right rim.

10. The pair of interchangeable eyeglasses of claim 1, wherein the right rim comprises a top surface having a first shape and the left rim comprises a top surface having a second shape, the first shape different than the second shape.

11. The pair of interchangeable eyeglasses of claim 1 wherein the rear surface of the rear piece comprises a recess, wherein the removable pin comprises a bulge, and further wherein the bulge is seated in the recess.

12. The pair of interchangeable eyeglasses of claim 1 wherein the vertical post is located between the left peg and the right peg.

13. A method of wearing a pair of interchangeable eyeglasses by a human user comprising the steps of:
 a) providing the pair of interchangeable eyeglasses of claim 1;
 b) positioning the bridge above the human user's nose;
 c) positioning the left rim in front of the human user's left eye;
 d) positioning the right rim in front of the human user's right eye;

e) positioning the left temple tip around the human user's left ear; and
f) positioning the right temple tip around the human user's right ear.

* * * * *